US010582800B2

(12) United States Patent
Stork et al.

(10) Patent No.: US 10,582,800 B2
(45) Date of Patent: Mar. 10, 2020

(54) SYSTEM FOR MAKING A HOT BEVERAGE WITH SUBSTANTIALLY HORIZONTAL THROUGHFLOW AND METHOD FOR MAKING A HOT BEVERAGE (71) Applicants: Innobizzer B.V., Heerenveen (NL); Adriaan Ids Stork, Sint Annaparochie (NL)

(72) Inventors: Adriaan Ids Stork, Sint Annaparochie (NL); Antoon Siefko Oosterhuis, Heerenveen (NL)

(73) Assignees: Innobizzer B.V., Heerenveen (NL); Adriaan Ids Stork, Sint Annaparochi (NL)

( * ) Notice: Subject to any disclaimer, the term of this patent is extended or adjusted under 35 U.S.C. 154(b) by 0 days.

(21) Appl. No.: 15/509,610

(22) PCT Filed: Sep. 8, 2015

(86) PCT No.: PCT/NL2015/050622
§ 371 (c)(1),
(2) Date: Mar. 8, 2017

(87) PCT Pub. No.: WO2016/072845
PCT Pub. Date: May 12, 2016

(65) Prior Publication Data
US 2017/0251868 A1 Sep. 7, 2017

(30) Foreign Application Priority Data
Sep. 8, 2014 (NL) .................................. 1040942

(51) Int. Cl.
A47J 31/44 (2006.01)
A23L 2/54 (2006.01)

(52) U.S. Cl.
CPC ............. *A47J 31/4496* (2013.01); *A23L 2/54* (2013.01); *A23V 2002/00* (2013.01)

(58) Field of Classification Search
CPC ......... A47J 31/44; A47J 31/4496; A23L 2/54; A23V 2002/00
See application file for complete search history.

(56) References Cited

U.S. PATENT DOCUMENTS 3,233,535 A * 2/1966 Fowlie .................... A47J 31/22
210/369
3,967,546 A * 7/1976 Cailliot ................... A47J 31/22
99/286

(Continued)

FOREIGN PATENT DOCUMENTS

| DE | 10247573 A1 | 4/2003 |
| EP | 2668880 A1 | 12/2013 |
| NL | 1032293 C | 8/2007 |

OTHER PUBLICATIONS

WO 2011/003474 A1, Van Den Brand Sep. 22, 2011.*

*Primary Examiner* — Anthony J Weier
(74) *Attorney, Agent, or Firm* — The Webb Law Firm (57) ABSTRACT The invention relates to a system and a method for making a hot beverage such as coffee. The system according to the invention includes a raw material container in which raw material for the hot beverage is arrangeable. The raw material container is provided with a liquid inlet, and an outlet with a substantially horizontal flow through the raw material. A nozzle assembly is connected operatively to the outlet and provided with an inlet, an air inlet and a nozzle. An outflow is connected operatively to the nozzle for delivery of the hot beverage.

13 Claims, 9 Drawing Sheets

(56) References Cited

U.S. PATENT DOCUMENTS

| | | | | |
|---|---|---|---|---|
| 5,265,517 A | * | 11/1993 | Gilbert | A23F 5/26 |
| | | | | 99/280 |
| 8,590,443 B2 | * | 11/2013 | Mahlich | A47J 31/3671 |
| | | | | 99/290 |
| 9,260,238 B2 | | 2/2016 | Brouwer et al. | |
| 9,668,496 B1 | * | 6/2017 | Lassota | A23F 5/18 |
| 2005/0139082 A1 | | 6/2005 | Brouwer et al. | |
| 2005/0172819 A1 | * | 8/2005 | Chen | A47J 31/0663 |
| | | | | 99/279 |
| 2009/0095163 A1 | * | 4/2009 | Sala | A47J 31/402 |
| | | | | 99/284 |
| 2010/0080877 A1 | * | 4/2010 | Reyhanloo | A47J 31/0663 |
| | | | | 426/433 |
| 2010/0178406 A1 | | 7/2010 | Verbeek | |
| 2010/0239717 A1 | * | 9/2010 | Yoakim | B65D 85/8043 |
| | | | | 426/84 |
| 2011/0052761 A1 | * | 3/2011 | Yoakim | A47J 31/22 |
| | | | | 426/77 |
| 2011/0305807 A1 | * | 12/2011 | Koeling | A47J 31/407 |
| | | | | 426/431 |
| 2013/0309364 A1 | * | 11/2013 | Gerbaulet | A47J 31/22 |
| | | | | 426/84 |

\* cited by examiner

SYSTEM FOR MAKING A HOT BEVERAGE WITH SUBSTANTIALLY HORIZONTAL THROUGHFLOW AND METHOD FOR MAKING A HOT BEVERAGE

CROSS-REFERENCE TO RELATED APPLICATIONS

This application is the United States national phase of International Application No. PCT/NL2015/050622 filed Sep. 8, 2015, and claims priority to Dutch Patent Application No. 1040942 filed Sep. 8, 2014, the disclosures of which are hereby incorporated in their entirety by reference.

BACKGROUND OF THE INVENTION

Field of the Invention

The present invention relates to a system for making a hot beverage such as coffee and hot chocolate. The system relates particularly to the preparation of a coffee provided with a cream or crema layer, for instance using pads with ground coffee.

Description of Related Art

Diverse ways of making a coffee with a layer of cream are known in practice. Use is usually made here of high pressure, for instance about 9 to 10 bar, to realize a coffee with a good layer of froth, crema or cream. In the case espresso is being prepared with a so-called pad, it is made by using a container with about 5-7 grams of a coffee product.

NL 1032293 for instance describes a method for providing a beverage provided with a fine-bubble froth layer. A pad is provided on one side here with a type of spout opening. This pad is then placed in a holder and flow therethrough takes place under pressure. A problem occurring here is that at a relatively low pressure, for instance less than 3 bar, the froth layer is of insufficient quality. It has additionally been found in practice that the flow through the pad, and particularly through the coffee product therein, is not optimal, whereby the coffee product is not used effectively and the efficiency thereof is therefore not optimal. Nor do such known systems result in a uniform extraction of the ground coffee.

The present invention has for an object to provide an improved method for making a hot beverage, whereby the above stated drawbacks are obviated or at least reduced.

SUMMARY OF THE INVENTION

Arranging the product to be extracted and/or dissolved, in particularly coffee product, in for instance a pad through which a liquid, in particular water, flows substantially in a horizontal direction achieves that the product is dissolved and/or extracted in effective manner. It has been found that this product is hereby utilized in effective manner. It has thus been found that, instead of using a conventional pad with for instance about 7 grams of product, it is possible to suffice with a cup with about 4 grams of product, which amounts to a raw material reduction of about 35-45%. It has been found possible to realize this reduction while maintaining or even improving a good quality of the hot beverage as end product.

Incorrect throughflow is prevented by the substantially horizontal throughflow. This incorrect throughflow occurs for instance in conventional systems because the coffee is not distributed wholly uniformly in the pads, for instance because of careless placing and also because of the pad being pressed down. Water will after all seek the path of least resistance, wherein the known systems are for this reason found to have a high loss of efficiency. The system according to the invention ensures that the liquid is always guided as fully as possible through the available quantity of ground coffee, thereby guaranteeing the best possible extraction.

The above-mentioned (froth) layer with fine bubbles on the hot beverage is realized according to the invention by providing a nozzle assembly in or on the raw material container, wherein the nozzle assembly is provided with a number of inflow openings arranged as air inlet in the side wall thereof. There can be one, two, four or other number of air inlets. In a preferred embodiment these inflow openings are located at or close to a change in diameter of the flow channel of the nozzle assembly, which channel extends substantially in a vertical direction during use. The desired suctioning of air into the nozzle assembly is hereby realized. The length of the channel is preferably about 15 mm so as to thereby realize a good mixing. The inflow openings are preferably provided with a diameter of for instance about 0.5-1.5 mm, more preferably 0.7-1 mm, and most preferably about 0.85 mm. A mixing is realized in the nozzle assembly. The mixture is then carried via a nozzle or outflow into a container or cup, wherein the hot beverage such as coffee is provided with an attractive layer of froth or cream or crema. The nozzle or outflow at the outer end of the nozzle assembly directed downward during use is preferably provided with a diameter in the range of about 0.85 mm. The nozzle assembly is preferably provided in a plastic material.

It is possible according to the invention to provide the raw material from more than a single component, for instance two part-pads arranged one above the other and/or adjacently of each other. A user can hereby provide for a personal blend of for instance types of coffee and/or an addition to the hot beverage, for instance milk or chocolate.

In a currently preferred embodiment the liquid inlet of the raw material container is positioned substantially centrally and the outlet is positioned substantially at or close to the periphery of the raw material container.

The specific configuration of the liquid inlet and the outlet achieves a substantially horizontal throughflow through the raw material. In this embodiment this flow runs from the centre of the raw material container to the periphery. The inlet can be a single opening. It is however also possible to provide a number of openings, for instance in a circle around the centre of the raw material container. It will be apparent that the substantially horizontal flow can also comprise a (small) vertical component for bridging the distance between the inlet and the outlet. The significant flow direction in the system according to the invention is however substantially horizontal. The liquid inlet of the raw material container preferably comprises an entry plate with passages in or close to the centre of the entry plate. The central supply of liquid to the raw material is hereby realized. In a preferred embodiment the passages debouch into a chamber so as to distribute the liquid as optimally as possible over the raw material.

The outlet of the raw material container preferably also comprises an exit plate with passages at or close to the periphery of the exit plate. The above stated substantially horizontal throughflow is realized with the exit plate in combination with the centrally positioned liquid inlet. In a preferred embodiment grooves which extend substantially in the direction of the periphery of the exit plate, preferably in radial direction, are provided close to the passages. The grooves preferably extend over a length of 1 to 2 cm with a width of about 1 to 2 mm. Other dimensions are also possible subject to the specific configuration of the system according to the invention.

In the currently preferred embodiment with an entry plate and an exit plate a chamber, in which the raw material is arrangeable, is provided in use between the entry plate and the exit plate. One or more pads with ground coffee, loose ground coffee, cocoa etc. can for instance be provided in this chamber such that the liquid, in particular water, can flow therethrough.

The diameter and/or width of the passages of the entry plate and/or the exit plate preferably lies in the range of 0.5-5 mm, preferably 1-4 mm, more preferably 2-3.5 mm and most preferably amounts to about 3 mm. It has been found that said range results in an effective operation with a good-quality end product.

In a currently preferred embodiment the openings of the passages are provided as round holes. Other shapes are likewise possible for the openings, for instance square, rectangular, tapering and so on. Openings are also understood to mean recesses. It has in addition been found that by providing the throughflow openings according to the invention the pressure drop of the fluid over the cup is very small, so that a hot beverage can be prepared at a low supply pressure of the liquid. It has been found that good results are obtained with a supply pressure in the range of 0.5-3 bar, preferably 1-2 bar, and even at a pressure of 1.5 bar, wherein the product is utilized optimally and a good froth layer, cream or crema layer is realized on the hot beverage, such as coffee.

In an advantageous preferred embodiment according to the invention the air inlet is adjustable with control means, wherein the air inlet adjustable with control means more preferably comprises a continuously adjustable inlet configured to adjust the quantity of air admixed during flow through the nozzle assembly.

Providing a continuously adjustable air inlet enables a user to add, within a certain range, any desired quantity of air to the mixture from the raw material container. A user can hereby realize a hot product with a desired quantity of froth of the desired type.

The invention also relates to an entry plate and/or assembly of entry plate and an exit plate for use in a system as described above and/or a coffee filter system.

Such an entry plate provides the same effects and advantages as described above for the system.

In conventional filter coffee systems the raw material, in particular the ground filter coffee, is not utilized optimally. This is because the water drips into the centre of the quantity of coffee, as a result of which optimal extraction cannot take place at the edges. An optimal guiding of the liquid through the raw material is achieved by providing an entry plate which is placed during use above the coffee filter. This optimal guiding of the water through the coffee is more particularly realized in respect of the filter coffee system in that a perforated entry plate is laid on top of the coffee filter, whereby the water is distributed more optimally over the available quantity of filter grind, with the immediate result of a greatly improved extraction.

An assembly according to the invention can be applied in effective manner in conventional preparation devices and thereby achieve largely the same effects and advantages as described above for the system.

The invention further also relates to a preparation device for preparing a hot beverage provided with a system as described above, and to the use thereof.

Such a preparation device provides the same effects and advantages as described above for the system.

The preparation device according to the invention is particularly suitable for realizing a supply pressure for the liquid in the stated range, preferably about 1.5 bar. It is hereby possible with a relatively simple construction of the preparation device to provide a hot beverage such as coffee of a good quality and with a good froth layer. The quantity and/or the type of froth can be adjusted by adjusting the variable air inlet.

The invention further also relates to a method for making a hot beverage and/or the use of the system or preparation device.

Such a method and use provide the same effects and advantages as described for the system and/or the entry plate.

The method has been found particularly advantageous for adjusting the quantity and/or the type of froth using adjustment of the adjustable air inlet. The raw material is utilized effectively and efficiently owing to the substantially horizontal throughflow of the raw material.

In a possible embodiment according to the invention the method comprises of the flow through the raw material taking place substantially in horizontal direction at a supply pressure in the range of 0.5-3 bar. The desired quality of the hot beverage, in particular coffee, can hereby be provided in effective manner.

BRIEF DESCRIPTION OF THE DRAWINGS

Further advantages, features and details of the invention are elucidated on the basis of preferred embodiments thereof, wherein reference is made to the accompanying drawings, in which.

DETAILED DESCRIPTION OF THE INVENTION

Figure 1:
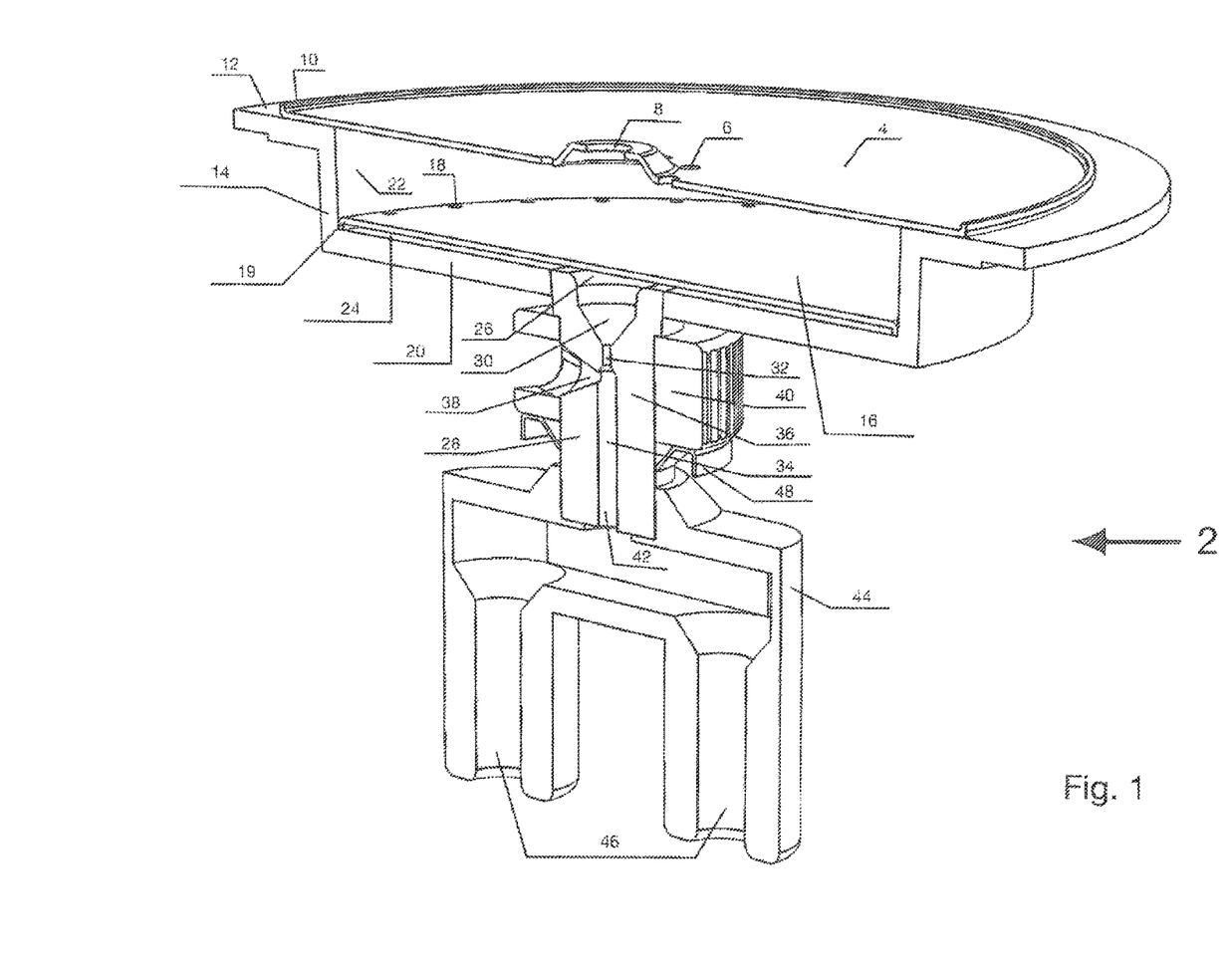
FIG. 1 shows a view of the system according to the invention.

System 2 (FIGS. 1-3) comprises an entry plate 4 provided with a number of inlet openings 6 arranged around central attaching opening 8. In the shown embodiment plate 4 is provided with upright edge 10 and rests on support edge 12 of raw material container 14. Exit plate 16 is provided on the side of raw material container 14 facing downward during use. Exit plate 16 is provided with a number of passage openings 18 close to the periphery. Exit plate 16 is also provided with bent edge 19 which rests on bottom 20 of raw material container 14. As illustrated in FIG. 1, the raw material container 14 has a central axis L. The liquid inlet 8 is positioned substantially centrally within a radius R1 of the central axis L and the passage openings 18, also referred to as outlets, are positioned at or close to the periphery of the raw material container 14 within a radius R2 of the central axis L. As illustrated in FIG. 1, R1 is less than R2.

Figure 2:
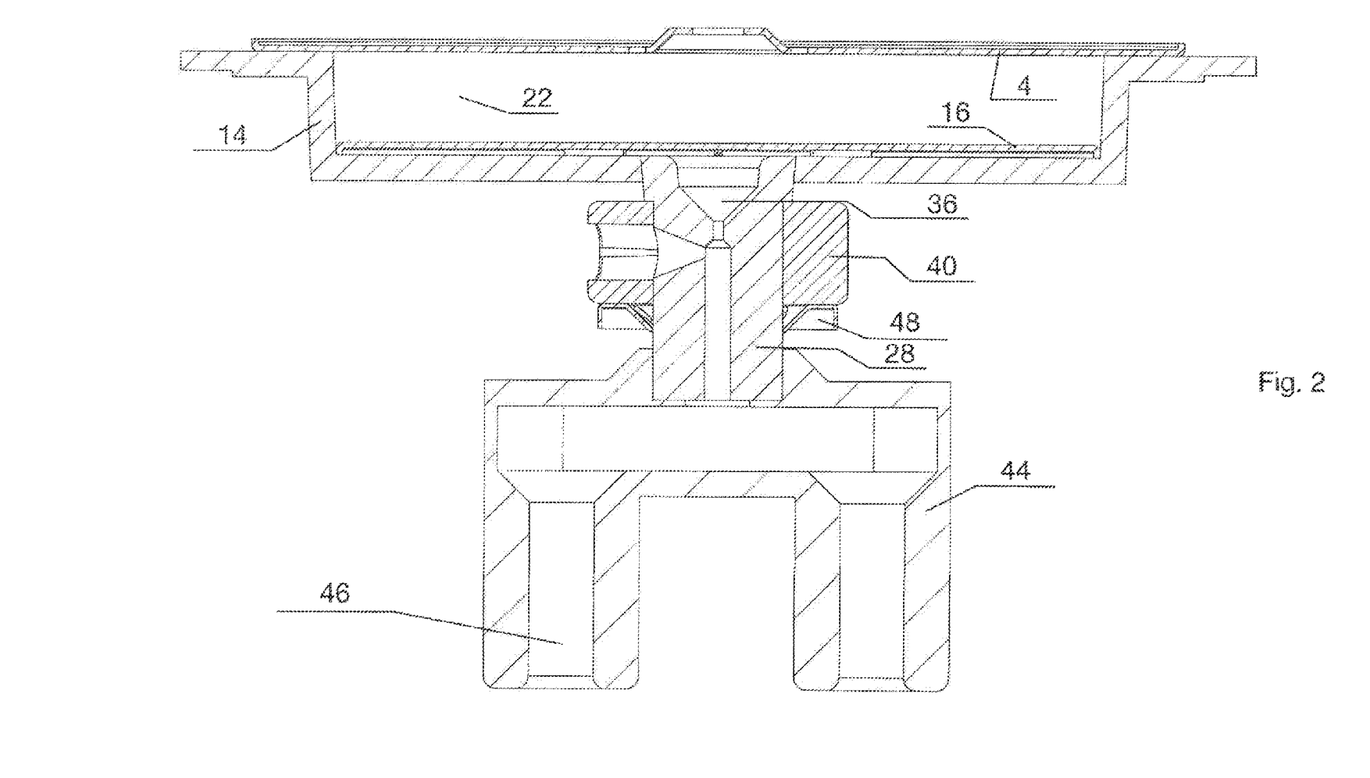
FIG. 2 shows a cross-section of the system of FIG. 1.
Figure 3:
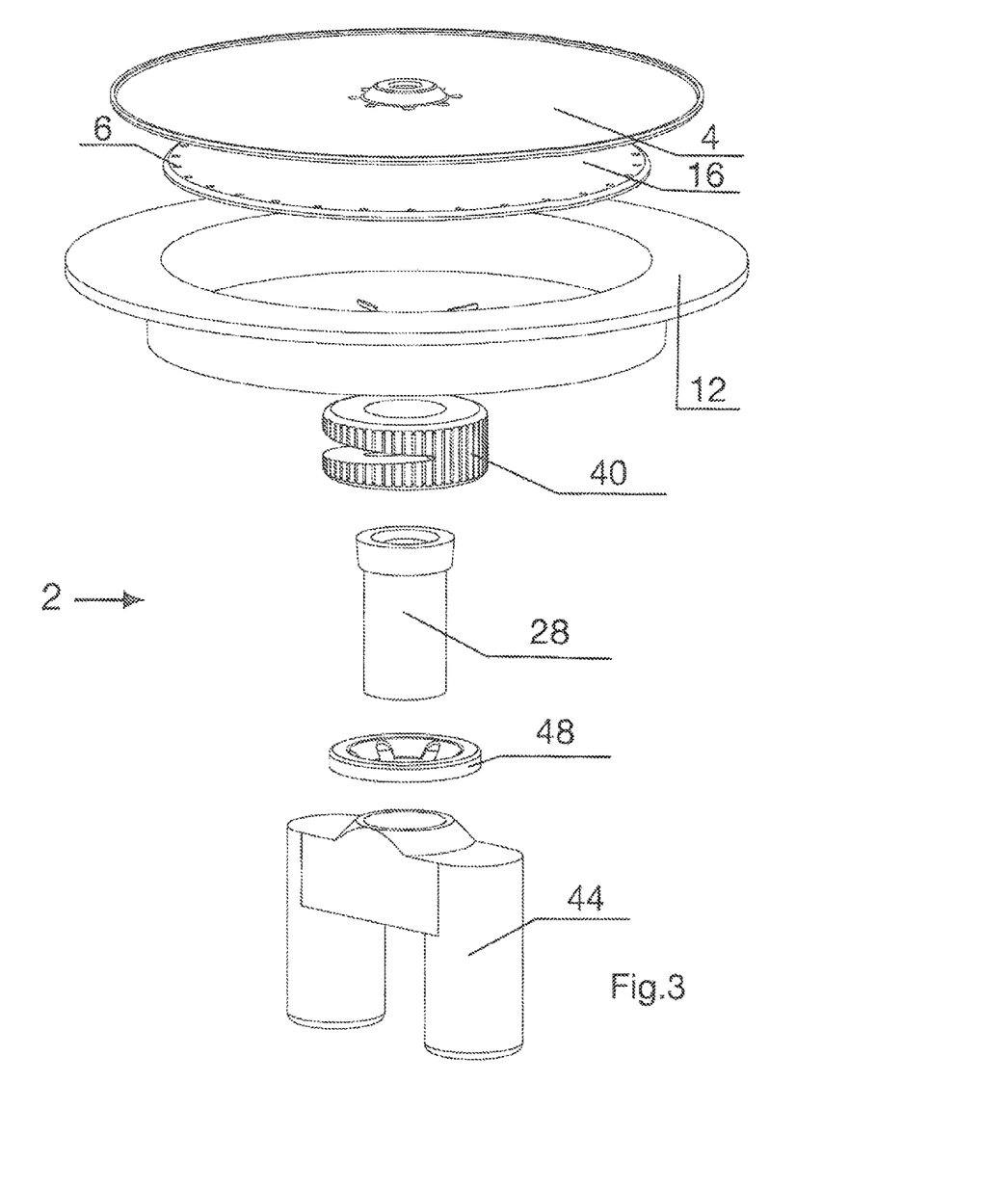
FIG. 3 shows an overview of components of the system of FIG. 1.

Space 22 in which raw material can be placed, for instance in the form of a number of pads, lies between plates 4, 16. Situated between exit plate 14 and bottom 20 is flow space 24 through which the mixture of raw material and liquid can flow in the direction of inlet 26 of nozzle assembly 28.

Nozzle assembly 28 is provided with funnel-shaped inlet space 30, narrowed portion 32 and flow channel 34. Air inlet 38 is arranged close to transition 36. The throughflow opening of inlet 38 is adjustable via rotatable closing device 40.

In the shown embodiment closing device 40 is provided with a rotatable ring. Outlet 42 of nozzle assembly 28 debouches into outflow part 44. In the shown embodiment outflow part 44 is provided with two outflows 46. In the shown embodiment ring 40 also rotates relative to nozzle assembly 28 and round air inlet 38. It will be apparent that other adjustable air inlets are also possible, for instance a slide valve or a tap.

In the shown embodiment, for instance for pad systems, system 2 provides the most central possible supply of hot water, wherein the coffee, for instance in a pad, is placed in chamber 22, wherein the combination of a centered water supply 6 at the top and outlets 18 all around at the bottom of the outer side of chamber 22 ensure that the water is guided as optimally as possible through the coffee, whereby the best possible extraction takes place. After use the possible pads can be removed from system 2 after extraction in substantially dry state without further leakage occurring.

In an alternative embodiment the supply of hot water takes place distributed all around the edges, while the outflow of the coffee from the chamber takes place in centered manner. In this embodiment, R2 is less than R1.

After leaving chamber 22 the coffee mixture then enters nozzle assembly 28, wherein via air inlet 38, which can be opened and closed in continuously variable manner, more or less or no air is mixed with the coffee according to a venturi principle, whereby it is possible in effective manner with continuously variable adjustment to opt to arrange a froth or crema layer on the coffee, or on the extraction product, or to dispense with such a froth layer by not supplying air.

Figure 4:
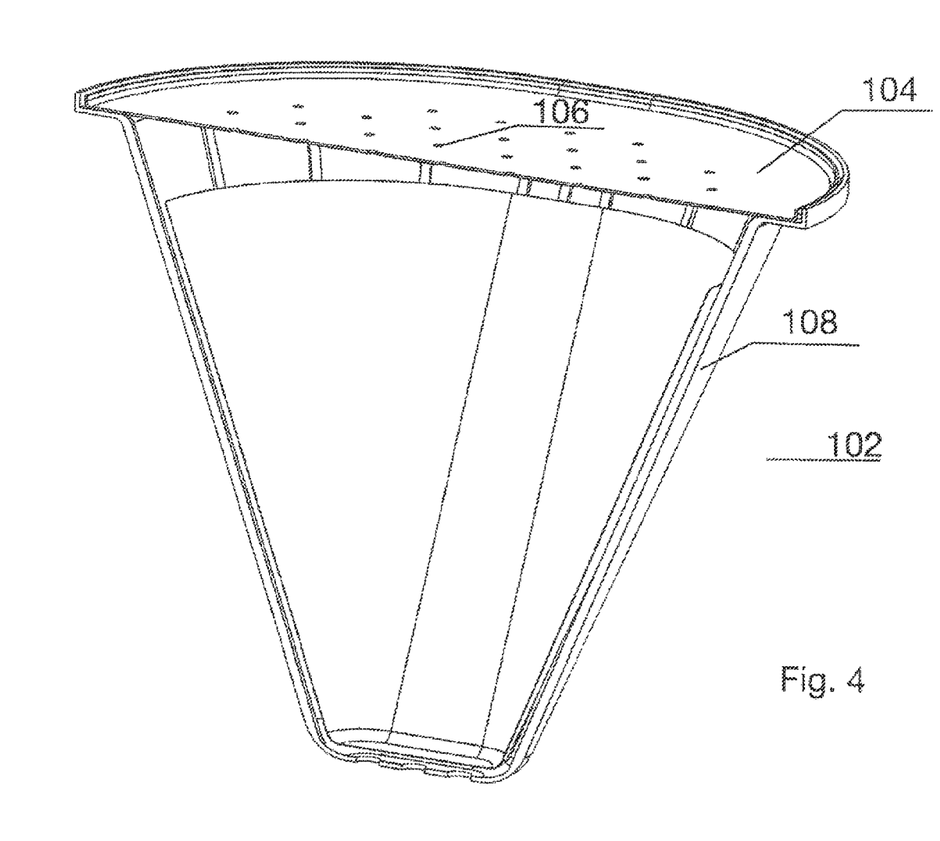
FIG. 4 shows a view of a container with entry plate for a coffee filter system.

Coffee filter 102 (FIG. 4) is suitable for arranging ground coffee therein for the purpose of preparing filter coffee. In order to improve the extraction it has been found that use can advantageously be made of entry plate 104, which is similar to entry plate 4 of system 2 but wherein passages 106 are distributed over the surface of plate 104. The distribution is adapted to the form of coffee container 108. Filter coffee is hereby produced in more effective manner.

Figure 5:
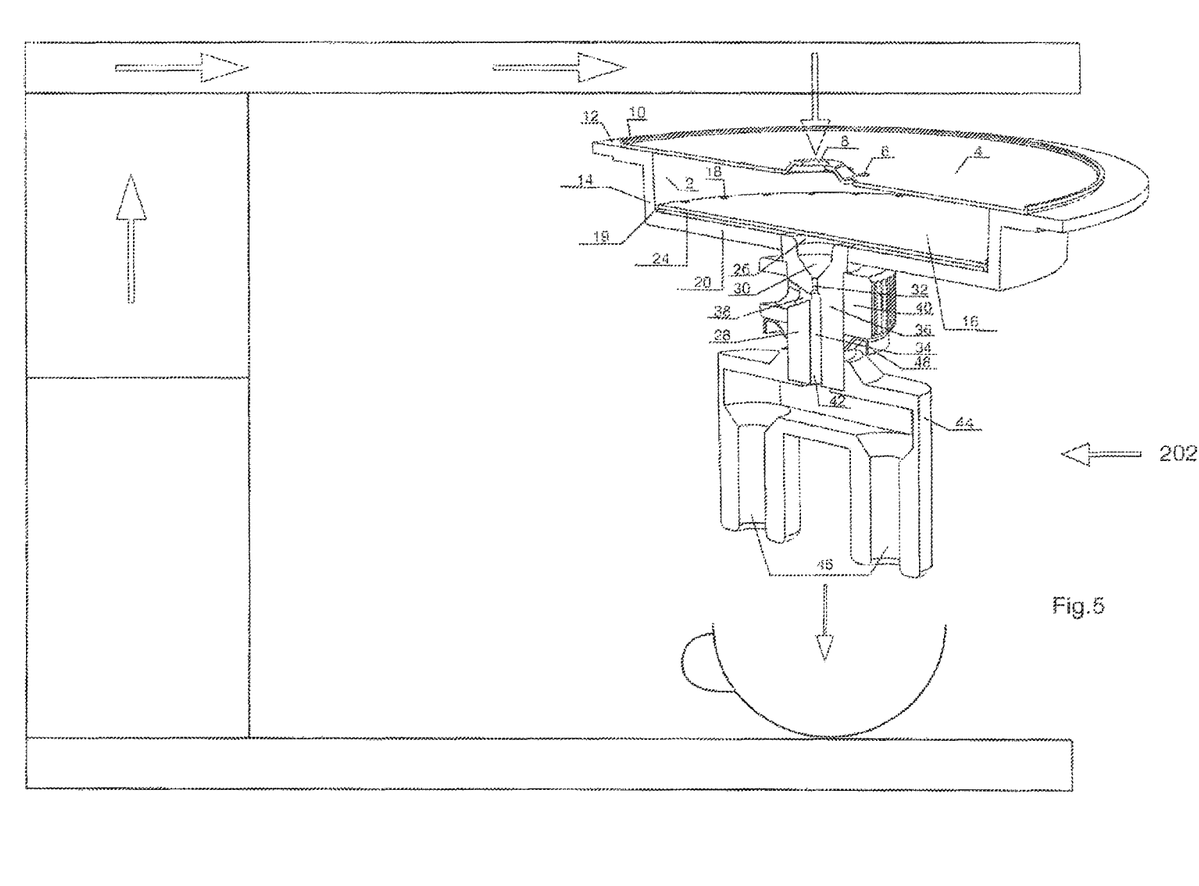
FIG. 5 shows a view of a preparation device provided with the system of FIG. 1.

System 2 can be accommodated in preparation device 202 (FIG. 5). System 2 hereby forms part of a whole apparatus with which liquid can be brought to desired conditions and can be used in the extraction process.

In the shown embodiment of assembly 2 a liquid, in particular water, is supplied preferably at a pressure of about 1.5 bar, and subsequently passes through cover part 4 so as to enter chamber 22 for the actual extraction and to obtain for instance a coffee mixture. The mixture then leaves chamber 22 via outlets 18 and enters nozzle assembly 28 via chamber 24. Air is supplied via air inlet 38 and mixed with the mixture such that the mixing in the interior of nozzle assembly 28 takes place as optimally as possible. The mixture is then discharged via outlet 42 and outflow 46, wherein a conical outward flow is preferably realized.

It has been found that using assembly 2 a good-quality coffee with desired quality of froth layer is realized in the shown embodiment at a supplied pressure of about 1.5 bar. A quantity of coffee product 10 of about 4 grams can be employed here, wherein compared to the 7-7.5 grams in conventional containers the amount of raw material employed at such relatively low supply pressures results in a significant saving of raw material. An improvement in quality of the froth layer can be realized at the same time.

Sub-system 302 (FIGS. 6-8) comprises a substantially vertically positioned cylinder 304, air inlet system 306 with the same operating principle as already described above, and outlet 308. Sub-system 302 can be applied for both horizontal and vertical throughflow of the raw material, for instance the coffee. It has been found that sub-system 302 is particularly suitable for substantially vertical throughflow. Apparatus 310 (FIG. 8) carries water (in the direction indicated with arrows) to sub-system 302 and subsequently fills cup 312.

Alternative entry plate 402 (FIGS. 9A-I) is provided with central passage 404, additional passages 406 positioned therearound, wherein ribs 408 are provided between the central part with passages 404, 406 and outer edge 412 on the side facing upward during use. Seal 410 is preferably provided at the transition between the central part and the part with ribs 408. Entry plate 402 rests with edge 412 on raw material container 14. In the shown embodiment passages 404, 406 debouch into throughfeed chamber 414 on the side of entry plate 402 facing downward during use. Exit plate 416 is provided with central closed part 418, wherein grooves 420 with passages 422 are provided close to the periphery. In the shown embodiment passages 422 are arranged in edge 424. Ring 426 is provided with walls 428 and passages 430. Exit plate 416 is preferably provided with clamping fit in raw material container 14.

During use pad 432 lies between entry plate 402 and exit plate 416 and flow through pad 432 takes place substantially in vertical direction, as indicated with arrows A. Pad 432 is preferably provided with upper side 434 with a usual open structure and underside 436 which is substantially closed in order to enhance horizontal throughflow. Such pads 432 can also be applied in further alternative systems with substantially horizontal throughflow and preferably adjustable air inlet.

A number of configurations are possible according to the invention, wherein a configuration can be adapted to for instance the type of raw material and/or preferences of the user. This relates for instance to dimensions of the nozzle or nozzle assembly and to attachment thereof. It will be apparent that other combinations of measures and configurations are also possible according to the invention.

It has been found that, particularly as a result of a combination of the container with the preferred dimensions for the inflow openings with a nozzle which is provided in the range of 0.5-1.0 mm, preferably 0.6-0.9 mm and which most preferably amounts to about 0.8 mm, not only is a correct mixing in the channel of the nozzle assembly realized but also a desired outflow of the liquid into the cup or other container.

The length of the nozzle assembly preferably employed here lies in the range of 5-20 mm, preferably 8-18 mm, and most preferably amounts to about 15 mm. A part of this length is located in the interior of the chamber of the container, while during use a part of the length extends on the underside to a position outside the chamber of the container.

The nozzle assembly can be arranged in the container using a clamping fit, wherein a stop or collar/flange is arranged if desired on the outer side of the nozzle with which it rests on the bottom of the container and is pressed against the underside during use by the pressure prevailing in the chamber. The number of components required is hereby very small. It has even been found that additional seals are not required. It is possible if desired to embody the container integrally with the nozzle assembly.

It will be apparent that different measures shown for the different embodiments can also be combined with each other to form new embodiments according to the invention.

Figure 6:
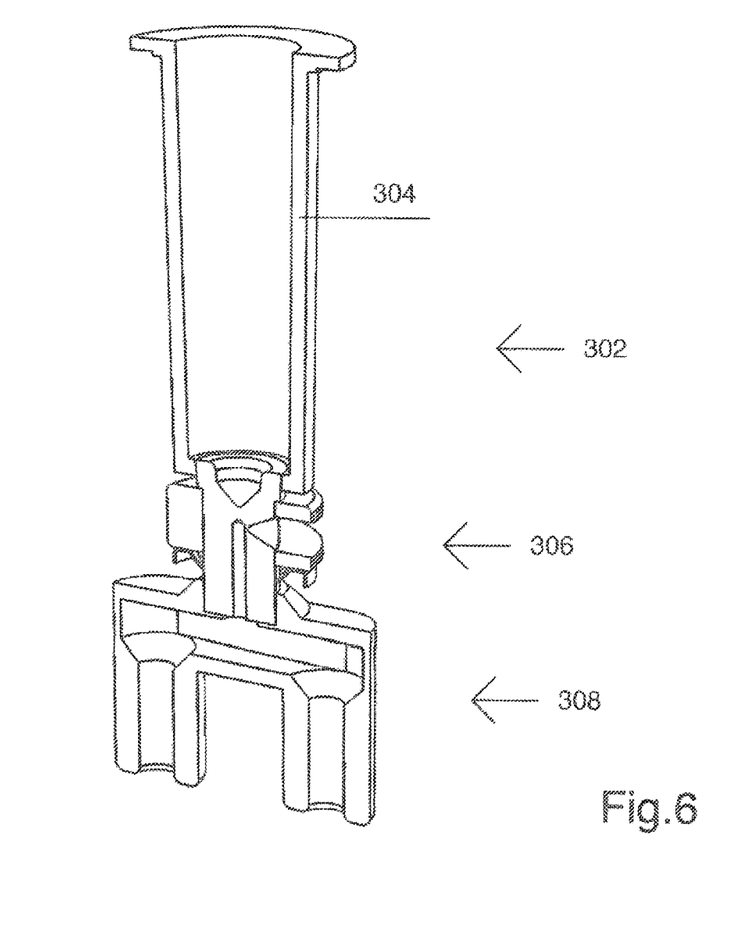
FIGS. 6, 7, and 8 show views of an alternative system provided with components according to the invention.
Figure 7:
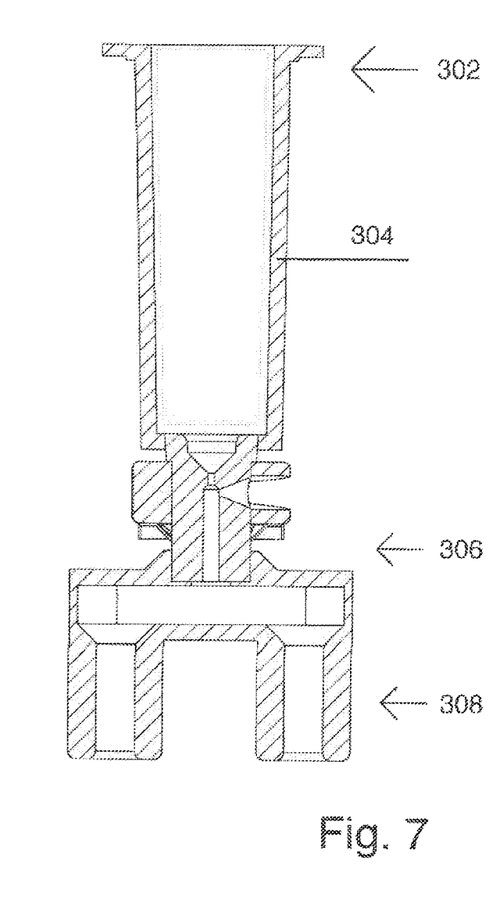
Figure 8:
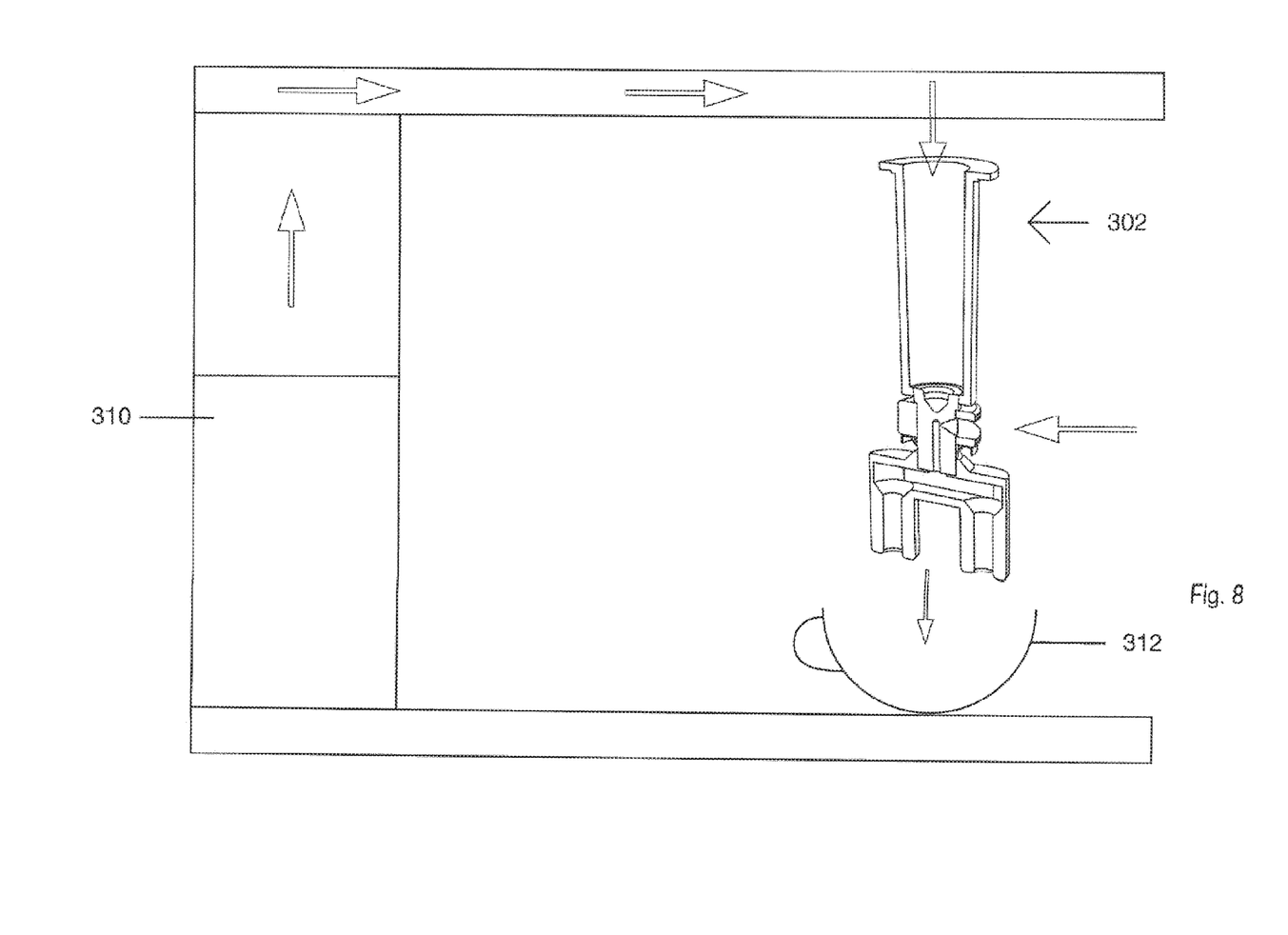
Figure 9A:
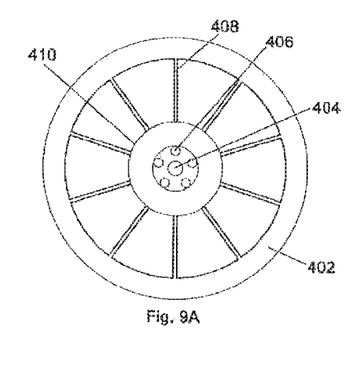
FIGS. 9A, 9B, 9C, 9D, 9E, 9F, 9G, 9H, and 9I show views of alternative components of the system according to the invention.
Figure 9B:
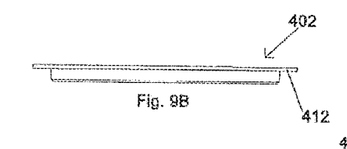
Figure 9C:
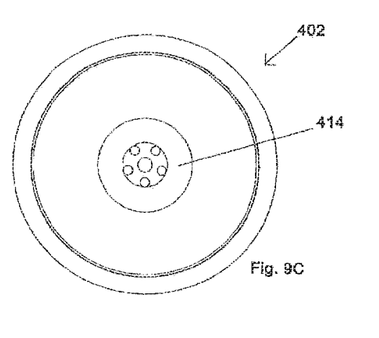
Figure 9D:
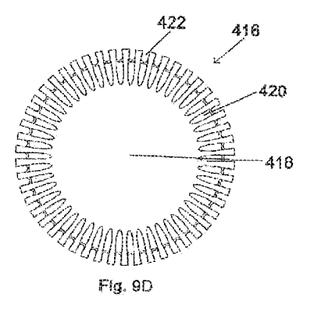
Figure 9E:
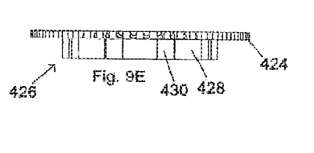
Figure 9F:
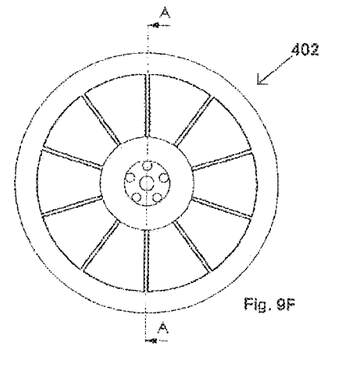
Figure 9G:
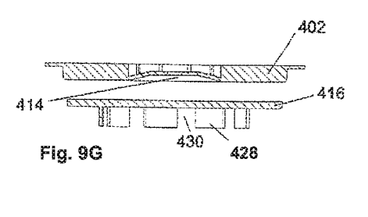
Figure 9H:
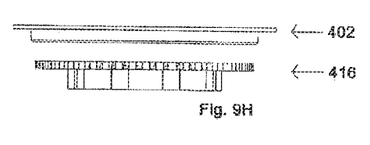
Figure 9I:
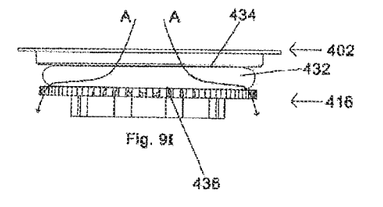

Parts of the present invention can be applied to an alternative preparation device for preparing hot beverages, wherein the throughflow direction is substantially vertical (FIGS. 6-8). The adjustable air inlet can for instance be envisaged here. This is achieved by having the water flow through a cylinder, wherein the diameter and the height of the cylinder are determined by the pressure available in the preparation device, and by the optimal extraction. In the preferred embodiment there is a cylinder with an inner dimension of about 8 to 20 mm, preferably about 10 mm, and a length of about 40 to 100 mm, preferably about 60 mm. This substantially vertical preparation also results in a greatly improved extraction compared to the heretofore known systems. It has been found that good results are achieved at a supply pressure in the range of 0.5-3 bar, preferably 1-2 bar and even at a pressure of 1.5 bar.

The present invention is by no means limited to the above described preferred embodiments thereof. The rights sought are defined by the following claims, within the scope of which many modifications can be envisaged.

The invention claimed is:

1. A system for making a hot beverage, comprising:
   a raw material container in which raw material for the hot beverage is arrangeable;
   wherein the raw material container has a central axis;
   wherein the raw material container is provided with a liquid inlet;
   wherein the raw material container is provided with an outlet for a mixture of raw material and liquid;
   wherein the liquid inlet and the outlet of the raw material container are positioned such that a liquid can flow substantially horizontally through the raw material in the raw material container;
   wherein one of the liquid inlet and the outlet is positioned substantially centrally within a radius R1 of the central axis and the other of the liquid inlet and the outlet is positioned substantially at or close to the periphery of the raw material container within a radius R2 of the central axis, wherein R1 is less than R2, such that the liquid is guided as fully as possible through the available quantity of raw material;
   a nozzle assembly connected operatively to the outlet and provided with:
      an inlet for the mixture of raw material and the liquid;
      an air inlet for admitting air during throughflow of the nozzle assembly, wherein the air inlet comprises an inlet configured to introduce or admix air during throughflow of the nozzle assembly; and
      a nozzle;
   wherein the nozzle assembly is provided with a configuration wherein air is admixed as the mixture flows through;
   an outflow connected operatively to the nozzle for delivery of the hot beverage;
   wherein the air inlet is provided with a controller;
   wherein the outlet of the raw material container comprises an exit plate with passages at or close to the periphery of the exit plate and;
   wherein grooves are provided which extend in a direction toward the periphery of the exit plate into the passages.

2. The system as claimed in claim 1, wherein the liquid inlet of the raw material container comprises an entry plate with passages in or close to the centre of the entry plate.

3. The system as claimed in claim 1, wherein a diameter and/or width of the passages lies in the range of 0.5-5 mm.

4. The system as claimed in claim 2, wherein the outlet of the raw material container comprises an exit plate with passages at or close to the periphery of the exit plate and wherein a chamber, in which the raw material is arrangeable, is provided in use between the entry plate and the exit plate.

5. The system as claimed in claim 1, wherein the air inlet adjustable with the controller comprises a continuously adjustable inlet configured to adjust with the controller the quantity of air admixed during flow through the nozzle assembly.

6. The system as claimed in claim 1, wherein a diameter and/or width of the passages lies in the range of 0.5-5 mm.

7. The system as claimed in claim 6, wherein the outlet of the raw material container comprises an exit plate with passages at or close to the periphery of the exit plate and wherein a chamber, in which the raw material is arrangeable, is provided in use between the entry plate and the exit plate.

8. The system as claimed in claim 1, wherein the liquid inlet of the raw material container comprises an entry plate with passages in or close to the centre of the entry plate.

9. The system as claimed in claim 8, wherein the outlet of the raw material container comprises an exit plate with passages at or close to the periphery of the exit plate.

10. A preparation device for preparing a hot beverage comprising a system for making a hot beverage, comprising:
    a raw material container in which raw material for the hot beverage is arrangeable;
    wherein the raw material container has a central axis;
    wherein the raw material container is provided with a liquid inlet;
    wherein the raw material container is provided with an outlet for a mixture of raw material and liquid;
    wherein the liquid inlet and the outlet of the raw material container are positioned such that a liquid can flow substantially horizontally through the raw material in the raw material container;
    wherein one of the liquid inlet and the outlet is positioned substantially centrally within a radius R1 of the central axis and the other of the liquid inlet and the outlet is positioned substantially at or close to the periphery of the raw material container within a radius R2 of the central axis, wherein R1 is less than R2, such that the liquid is guided as fully as possible through the available quantity of raw material;
    a nozzle assembly connected operatively to the outlet and provided with:
       an inlet for the mixture of raw material and the liquid;
       an air inlet for admitting air during throughflow of the nozzle assembly, wherein the air inlet comprises an inlet configured to introduce or admix air during throughflow of the nozzle assembly; and
       a nozzle;
    wherein the nozzle assembly is provided with a configuration wherein air is admixed as the mixture flows through;
    a controller for adjusting the quantity of air admixed during flow through the nozzle assembly;

an outflow connected operatively to the nozzle for delivery of the hot beverage;
an entry plate; and
an exit plate.

11. A method for making a hot beverage comprising:
providing a raw material in a raw material container for which the hot beverage is arrangeable;
wherein the raw material container has a central axis;
wherein the raw material container is provided with a liquid inlet;
wherein the raw material container is provided with an outlet for a mixture of raw material and liquid;
wherein the raw material container has an entry plate and an exit plate;
wherein the liquid inlet and the outlet of the raw material container are positioned such that a liquid can flow substantially horizontally through the raw material in the raw material container;
wherein one of the liquid inlet and the outlet is positioned substantially centrally within a radius R1 of the central axis and the other of the liquid inlet and the outlet is positioned substantially at or close to the periphery of the raw material container within a radius R2 of the central axis, wherein R1 is less than R2, such that the liquid is guided as fully as possible through the available quantity of raw material;
a liquid flowing through the raw material substantially in a horizontal direction;
a mixture of raw material and liquid flowing via the outlet to a nozzle assembly, wherein the nozzle assembly is provided with:
an inlet for the mixture of raw material and the liquid;
an air inlet for admitting air during throughflow of the nozzle assembly wherein the air inlet comprises an inlet configured to introduce or admix air during throughflow of the nozzle assemble; and
a nozzle;
wherein the nozzle assembly is provided with a configuration wherein air is admixed as the mixture flows through;
admixing air into the mixture with the air inlet;
adjusting with a controller the quantity of air admixed during flow through the nozzle assembly; and
allowing the hot beverage to flow out of the nozzle and an outflow.

12. The method as claimed in claim 11, comprising the flow through the raw material taking place substantially in a horizontal direction at a supply pressure in the range of 0.5-3 bar.

13. The method as claimed in claim 12, comprising adjusting with a controller the quantity of air admixed during flow through the nozzle assembly.

* * * * *